(12) United States Patent  
Peters et al.

(10) Patent No.: US 11,585,928 B2  
(45) Date of Patent: Feb. 21, 2023

(54) LIDAR MEASURING DEVICE

(71) Applicant: METEK Meteorologische Messtechnik GmbH, Elmshorn (DE)

(72) Inventors: Gerhard Peters, Hamburg (DE); Ernst Brinkmeyer, Buchholz (DE); Christoph Bollig, Göttingen (DE)

(73) Assignee: METEK Meteorologische Messtechnik GmbH, Elmshorn (DE)

( * ) Notice: Subject to any disclaimer, the term of this patent is extended or adjusted under 35 U.S.C. 154(b) by 720 days.

(21) Appl. No.: 16/496,403

(22) PCT Filed: Mar. 20, 2018

(86) PCT No.: PCT/EP2018/057050  
§ 371 (c)(1),  
(2) Date: Sep. 20, 2019

(87) PCT Pub. No.: WO2018/172369  
PCT Pub. Date: Sep. 27, 2018

(65) Prior Publication Data  
US 2021/0109218 A1    Apr. 15, 2021

(30) Foreign Application Priority Data  
Mar. 22, 2017   (DE) ..................... 10 2017 106 226.2

(51) Int. Cl.  
*G01P 3/36* (2006.01)  
*G01S 17/58* (2006.01)  
(Continued)

(52) U.S. Cl.  
CPC .............. *G01S 17/58* (2013.01); *G01S 7/484* (2013.01); *G01S 7/4814* (2013.01); *G01S 7/4911* (2013.01); *G01S 17/88* (2013.01)

(58) Field of Classification Search  
None  
See application file for complete search history.

(56) References Cited

U.S. PATENT DOCUMENTS

2015/0301178 A1* 10/2015 Brinkmeyer ............ G01S 17/32  
250/227.23

FOREIGN PATENT DOCUMENTS

CN        105452899 A  *  3/2016   ............... G01S 7/48  
EP        2730947 A1       5/2014  
(Continued)

OTHER PUBLICATIONS

"Kakuma Seiichi. "Frequency-modulated continuous-wave laser radar using dual vertical-1-14, 16 cavity surface-emitting laser diodes for real-time measurements of distance and radial velocity" Optical Review, vol. 24, No. 1, Dec. 3, 2016 (Dec. 3, 2016), p.", Abstract.

(Continued)

*Primary Examiner* — Mark Hellner  
(74) *Attorney, Agent, or Firm* — Johnson, Marcou, Isaacs & Nix, LLC

(57) ABSTRACT

A LIDAR measuring device and a method for determining the speed of particles in a measuring volume includes a narrowband continuous wave laser light source (1), which emits light which is coupled into a measuring branch (3) and a reference branch (4). The light coupled into the measuring branch (3) is at least partially emitted by a transmitting device in the direction of the measuring volume such that the emitted light is at least partially scattered and/or reflected by the particles in the measuring volume. A part of the scattered and/or reflected light is then received by a receiver device and is coherently superimposed with the light leaving the reference branch (4), and the resulting light beam is directed onto a detector (6) to generate a detector signal characteristic for the resulting light beam. Finally, the speed of the particles in the measuring volume is determined in an evaluation unit (11) by taking into account the detector signal.

16 Claims, 3 Drawing Sheets

(51) Int. Cl.
    *G01S 7/481*     (2006.01)
    *G01S 7/484*     (2006.01)
    *G01S 7/4911*     (2020.01)
    *G01S 17/88*     (2006.01)

(56) References Cited

FOREIGN PATENT DOCUMENTS

| | | | | |
|---|---|---|---|---|
| EP | 3428685 | * | 9/2020 | ............ G01S 17/95 |
| JP | 2013238474 A | * | 11/2013 | ............ G01S 7/491 |
| WO | WO 2017187815 A1 | * | 11/2017 | ............ G01S 13/95 |
| WO | 2018172369 A1 | | 9/2018 | |

OTHER PUBLICATIONS

Knoll, "PCT Search Report issued in PCT/EP2018/057050", dated Jul. 2, 2018, 3 pages.
Mitchell, et al., "Development of a high speed wideband frequency tunable infra-red laser source for real-time wind turbine array sensing applications; Abstract", Proc. of SPIE, vol. 8069, 2011, pp. 806907-1-806907-1.

* cited by examiner

LIDAR MEASURING DEVICE

CROSS REFERENCE TO RELATED APPLICATIONS

The instant application should be granted the priority dates of Mar. 20, 2018, the filing date of the international patent application PCT/EP2018/057050 and Mar. 22, 2017, the filing date of German Patent Application DE 10 2017 106 226.2.

BACKGROUND OF THE INVENTION

The invention relates to a LIDAR measuring device as well as a method for determining the speed of particles in a measuring volume. With the help of the described device as well as the method, the measurement of a wind speed in a remote measuring volume is realized with a narrowband continuous wave laser light source. The light emitted by the continuous wave laser light source is coupled into a measuring branch and a reference branch, wherein at least a part of the light coupled into the measuring branch is at least partially emitted by a transmitting device in the direction of the measuring volume in such a way that the emitted light is at least partially scattered and/or reflected by the particles in the measuring volume such that at least one part of the scattered and/or reflected light is received by a receiver device. This scattered and/or reflected received light is then coherently superimposed with the light leaving the reference branch, and the resulting light beam is directed onto a detector to generate a detector signal characteristic for the resulting light beam. The speed of the particles in the measuring volume is determined in an evaluation unit by taking into account the detector signal.

In general, land-based measuring methods for determining the wind speed and the wind direction for different altitude ranges of the atmosphere, for example to monitor industrial pollutant sources, for weather forecasts, as well as for atmospheric and climate research have been known for many years. In this context, for example, so-called SODAR measuring systems are used for wind measurements, wherein they use the Doppler effect with soundwaves which are scattered back from the atmosphere. Due to the use of wind energy, which is increasingly gaining in importance in recent years, a new significant application area has opened up for such measuring methods to measure wind speed and direction in areas remote from the actual measuring device. In addition to the known SODAR systems, so-called LIDAR measuring systems in which light is used instead of sound and which are partially superimposed on the SODAR have been used for such measurements recently.

LIDAR (light detection and ranging) is a method, related to radar, for the optical measurement of distance and speed as well as the measurement of atmospheric parameters. LIDAR systems for the atmospheric measurement emit a laser beam and detect the light scattered back from the atmosphere. The distance away from the location of the scattering is calculated from the light travel time of the signals. In particular, clouds and dust particles in the air scatter the laser light and enable a high-resolution selection and distance measurement of clouds and aerosol layers.

Furthermore, it is possible to determine the wind speed prevailing at a location remote from the measuring device with the LIDAR measuring systems via the measurement of light which is scattered and/or reflected on particles moved by wind. This type of measurement can be used, in particular, to measure the prevailing wind speed upstream of a wind turbine up to a few hundred meters away and to adapt control parameters of the wind turbine based on the measured wind speed. On one hand, the most effective use of a wind turbine possible and, on the other hand, system overloads due to special wind events should hereby be assured. In this manner, emergency measures can be introduced in a timely manner, for example with extreme wind gusts, in order to extensively prevent damage to the wind turbine.

The known LIDAR measuring systems for determining wind speeds are based on the detection and evaluation of the Doppler frequency shift of the scattered light effected by the scattering of laser light on the particles moved with the wind in comparison to emitted light (cf.: C. Weitkamp, LIDAR-range-resolved optical remote sensing of the atmosphere, Springer 2005).

Typically, the Doppler frequency shift is determined interferometrically by means of superimposition of the scattered light received by the measuring device with light which is coupled into the measuring device by the laser light source by means of a second optical path. To this end, highly coherent laser light sources which emit light with coherence lengths of several hundred meters, in which the bandwidth of the frequency is in the sub-MHz range, are used with the known LIDAR measuring devices.

In order to ensure the required and/or desired spatial resolution, essentially two different procedures are known. A first technical variant provides for the use of continuous wave laser sources which are focused on to the respectably desired target area with the help of a suitable optical system, for example a lens or a telescope. A corresponding technical solution is described in WO 2005/1142531. In the event that the desired focus area should be changed, this is achieved with the help of mechanical elements which usually have, however, a comparatively complex design and are expensive. Moreover, such adjusting elements carry the risk of additional faults, primarily in long-term operation.

A second technical variant for achieving and changing the desired spatial resolution is based on the use of pulsed laser sources. In this case, the location determination takes place by means of a travel-time measurement of the laser pulses. In this manner, multiple sequential measuring regions can be measured by the measuring system with a pulse, the pulse width of which determines the spatial resolution which is, for example, 30 m for pulses with a width of 200 ns. In this case, the individual sequentially measured measuring regions can each represent subsections of the entire measuring volume to be tested.

However, the illumination of an individual measuring region by a pulse, said illumination only occurring for a brief time, results in poor signal-to-noise ratios. Furthermore, the frequency resolution and thus also the resolution of the wind speed is limited due to the short pulse widths.

Starting from the previously described measuring systems, WO 2014/072514 discloses a further technical solution for recording the wind speed in a remote spatial area, which achieves a change of the spatial resolution with alternative technical measures. It is essential for this technical solution that a narrowband light source is used, which is modulated with a defined phase pattern, instead of the laser light sources typically used. Firstly, a relatively low transmitting power is required due to the use of a continuous wave laser source as compared to pulsed LIDAR. In addition, the spatial resolution does not have to be balanced against the speed resolution with a pulse LIDAR, but rather both parameters can be selected independently of one another within wide limits. In comparison to focused continuous wave LIDAR (CW-LIDAR), this solution furthermore offers the advantage that the spatial resolution does not become coarser as the distance increases but instead is independent of distance.

An essential component of the described LIDAR measuring device is a modulator, which is based, for example, on the electro-optical effect in a suitable material and which ensures desired phase modulation of the frequency of the light emitted by a laser diode. This modulator represents a comparatively expensive component, which furthermore requires a suitable actuation as well as supply of energy, in relation to the measuring device.

A problem with the previously known LIDAR measuring systems is that a spatial resolution can only be assured either with comparatively extensive complexity and components somewhat susceptible to faults, or comparatively expensive opto-electric components are required. This makes the provision of reliable and simultaneously economical LIDAR measuring devices significantly more difficult, particularly for the use of wind energy. Furthermore, it is often not possible with the known LIDAR measuring devices to differentiate, in a satisfactory manner, a positive Doppler shift caused by different movements of the particles in the measuring region from a negative Doppler shift. Further measuring devices must often be used as a supplement to the LIDAR measuring device.

SUMMARY OF THE INVENTION

With consideration of the technical solutions known from the prior art for recording speed as well as the direction of movement of particles in a remote measuring volume with the help of a LIDAR measuring system and the previously explained problems, the object of the invention is to further develop a LIDAR measuring system such that a highly precise speed measurement of particles moved in the remote measuring region is possible with the help of a comparatively simple construction. The technical solution to be indicated in this case should primarily enable a comparatively simple adjustment and setting of the spatial resolution. It should further be assured that a direction of movement of the particles in the measuring region can also be determined reliably with simple means, particularly without the additional measuring devices and/or complex components being absolutely necessary.

The invention is based on a LIDAR measuring device for determining the speed of particles in a measuring volume with a narrowband continuous wave laser light source, which emits light modulated in its optical frequency and then coupled into a measuring branch and a reference branch. The light coupled into the measuring branch is at least partially emitted in the direction of the measuring volume by a transmitting device in such a way that the emitted light is at least partially scattered and/or reflected by the particles in the measuring volume such that at least one part of the scattered and/or reflected light is received by a receiver device. Furthermore, the received light is coherently superimposed with the light leaving the reference branch, and the resulting light beam is directed onto a detector to generate a detector signal characteristic for the resulting light beam. The speed of the particles in the individual measuring regions of the measuring volume is then determined in an evaluation unit by taking into account the detector signal. The invention is characterized in that the frequency of the light emitted by the laser light source is varied with a control device in a predefined manner, and a spectral analysis of the detector signal is carried out in the evaluation unit in order to calculate the speed of the particles in the individual measuring regions of the measuring volume, while taking into account the predefined frequency change and/or frequency modulation. The expressions "frequency modulation" and/or "frequency change" should be understood as having the same meaning with reference to the description of the invention.

When evaluating the received beam, a Doppler frequency shift is determined and evaluated between the beam entering the respective measuring region and the received, scattered and/or reflected beam. In contrast with the known technical solutions, it is essential for the invention that the frequency of the light emitted by the laser light source be changed and/or modulated. Due to the modulation of the frequency, it is possible, with the help of a known function, to select the spatial resolution and to precisely define the distance between the measuring device and the respective measuring region to be measured with the particles contained therein.

This is achieved in that a spectral broadening and deformation of the at least extensively monochromatic light is achieved based on the change in the frequency of the light emitted, wherein the bandwidth determines the coherence length. Thus, it is possible to implement various coherence lengths and thus spatial resolutions with the same laser light source. A narrowband laser light source, which is preferably light with a bandwidth which is less than 1 MHz, preferably less than 100 kHz, especially preferably less than 10 kHz, is used as the laser light source. The measuring device preferably contains an optical amplifier, which can be located behind the laser source before the split-off into the measuring and reference branch or in the measuring branch.

In an advantageous manner, the power supply of the laser light source is modulated directly, which ultimately leads to a variation of the frequency of the emitted light beam and thus of the power spectral density. Due to the technical solution used, that is the frequency modulation of the emitted light, a highly precise measurement of the speed of the particles moved in a remotely placed measuring volume can be implemented without the use of comparatively expensive components.

According to a special embodiment of the invention, the laser light source is designed as a laser diode, which emits at least approximately monochromatic light. In a preferred manner, the injection current of the laser diode is varied in this case with the help of a suitably designed control device and/or with the help of the control signal generated by the control device. This variation of the power supply leads, on one hand, to a typical, insignificant change in the output power and, on the other hand, to a desired variation in the optical frequency and/or wavelength of the emitted light. In this manner, it is possible, for example, to achieve a change in the optical frequency per change in the injection current change in a range of from 0.5 to 1 GHz/mA with a DFB laser, which emits light in a wavelength range of from 1530 to 1570 nm, preferably of 1550 nm. However, such lasers typically have a line width of from 1 to 3 MHz, which is not especially well-suited for the described application. If smaller line widths, for example of 50-100 kHz, are required, so-called extended cavity lasers (ECLs) can be used in an advantageous manner, which have a tuning coefficient which is greater than 0.1 GHz/mA.

Instead of implementing the intended frequency modulation by means of a modulation of the injection current, special laser diodes with frequency tuning ranges and special tuning electrodes can be used.

In a special further embodiment, the evaluation unit is implemented such that, on one hand, the known frequency function and, on the other hand, an additional time shift value are considered in evaluating the generated detector signal, in addition to the frequency modulation of the light emitted by the laser light source. The time shift value is selected such that the result of the function corresponds to the detector signal, which would result with selection of a reference branch, which has a travel time modified by the time shift value and thus also a correspondingly changed optical path length, as compared to the actual reference branch.

This design is based on the knowledge that the detector signal only contains the information required for the evaluation regarding particles in the measuring range corresponding to the actual optical path length of the reference branch and the coherence length, which only represents a part of the entire illuminated region, but also respective information regarding particles and other illuminated regions, which do not correspond to the selected measuring region and/or the selected spatial resolution in the measurement currently being implemented.

In an advantageous manner, a continuous wave laser light source is used, the emitted light of which has a coherence length in a range of from 0.1 to 100 m based on the frequency modulation. Especially suitable is a coherence length in a range of from 1 to 100 m and very especially suitable in a range of from 1 to 50 m. When selecting the laser light source and/or defining the coherence length, it should be considered that coherent interference on the detector is only possible for the scattered light of particles and/or only the reflected light from objects, for which the optical path length of the measuring branch within the coherence length matches the optical path length of the reference branch. For this reason, a high spatial resolution, which is adjustable through the selection of the coherence length, is achieved by means of a greatly limited coherence length. In contrast, the scattered light reaching the detector array, said scattered light coming from particles located outside the coherence range, leads only to a broadband background in the detector signal, which can lead to a small reduction in the signal-to-noise ratio, but does not impact the spatial resolution. If the coherence range is less than the maximum expansion of the measuring volume, only a partial section, namely of the respective measuring region, is measured, and a particular spatial resolution can be achieved by means of its optical length, the coherence length, by means of shifting of the coherence range, for example with the help of an optionally available device to change the optical path length of the reference branch, which is preferably done with computing means. In an advantageous manner, the spatial resolution is independent of the distance of the respectively tested measuring region.

According to a further special embodiment of the invention, the control device is designed such that the variation of the frequency of the light emitted by the laser light source takes place based on a control signal generated by the control device, said control signal corresponding to a pseudo-noise signal caused by a predefined frequency function. In this manner, it is possible to modulate the frequency of the emitted light in a desired manner and, in doing so, to particularly adapt the optical power spectral density in a desired manner. Because the frequency function used in the control device is known, the respective laser light source can be used to implement various coherence lengths and thus various spatial resolutions.

In a special further embodiment of the invention, the frequency of the light emitted by the continuous wave light source is varied such that it has a time-linear portion, the latter being generated, for example, by an approximately time-linear portion in the laser diode injection current. This can be combined with the previously described pseudo-noise profile.

This measure enables, in a preferred manner, sign detection upon the frequency shift between the frequency of the emitted and received light caused by the Doppler effect.

The signal derived from the scattered and/or reflected light received does not contain the information on the frequency of the light but instead on the difference as compared to the frequency of a reference light, which was routed from the laser light source via the reference branch. The speed of the particles moved in the measuring volume is derived from this difference with consideration of the Doppler effect. In the simplest case, the reference light is branched off of the transmitter and has the same frequency as the emitted light.

In this context however, it must be considered that the frequency difference may have a positive or negative sign depending on the direction of movement of the particles in the measuring volume toward the LIDAR or away from the LIDAR. Due to the modulation, provided according to the invention, of the frequency of the light emitted by the laser light source, it is conceivable, in a preferred manner, to superimpose the frequency of the light with a further linear time-dependent signal such that the transmitting frequency of the light being emitted toward the measuring volume changes linearly. In an advantageous manner, it is provided in this case that a difference between the transmitting frequency and a frequency of the scattered and/or reflected light received by the receiver device is selected to be large enough that a sign of the difference does not change despite a Doppler shift of the frequency of the received light as compared to the transmitting frequency, said shift being caused by the movement of the particles. As soon as the difference between the transmitting frequency and the receiving frequency is selected to be particularly large in a suitable manner, the Doppler shift can no longer change the sign of the difference and the uniqueness is assured in relation to the direction of movement of the particles in the measuring volume.

With the previously described design of the linear frequency modulation, the frequency resolution can be worsened in an undesirable manner. This can be prevented by means of a corresponding limit on the slope of the linear frequency modulation. The potentially alternating sign of the difference between the transmitting frequency and the receiving frequency can be detected by means of a triangular frequency modulation and separate analysis of the ascending and the descending branch. The total appears in one branch and the difference between the Doppler shift and the frequency shift, based on travel time, appears in the other branch.

In a further particular embodiment of the invention, the frequency of the light emitted by the continuous wave laser light source is changed and/or modulated upward and downward. The resulting frequency shift of the received signal as compared to the transmitting signal then depends on the distance between the measuring region and/or the volume region, in which the scattering takes place, and on the Doppler shift. The frequency resolution is determined, as in the previously described method, with superimposed stochastic and linear frequency modulation by means of the slope of the modulation and the spatial resolution. The spatial resolution in this case is generated in a known manner by means of focusing, particularly with the help of suitably adjustable optical elements. Due to the triangular modulation of the transmitting signal, the sign of the frequency shift may also be determined in a preferred manner during the evaluation of the difference frequencies in the ascending and descending branch, as previously described. In comparison with the known methods which provide the determination of the wind direction with an additional measuring device, particularly with a weather vane, or the determination of the distance portion based on a separate measurement, the triangular modulation in this case represents an especially economical method for achieving a uniqueness when determining the direction of movement of the particles in the measuring volume. A further advantage of the triangular modulation is that not only the Doppler shift but also the precise effective distance of the focus can be derived by means of evaluation of the different frequencies in the ascending and descending branch. Depending on whether the Doppler shift causes a signed change of the difference frequencies or not, the Doppler shift is equal to half the difference (total) of the difference frequencies and the distance of the focus is equal to a fourth of the light speed multiplied by the total (difference) of the difference frequencies. It is easy to decide which case it is, because the approximate distance of the focus is known.

A special further embodiment of the invention is characterized in that an optical switch, for example an acousto-optic modulator, is used in the measuring branch. The pulse lengths in this case should be selected such that they are longer than what corresponds to the desired spatial resolution such that the spatial resolution continues to be determined by the frequency modulation of the laser source. With this operating mode, the detector signal is no longer continuously available. Despite of this, there are advantages in certain application cases, for example when inner reflexes from the measurement setup cannot be sufficiently suppressed, when a strongly incoherent background greatly worsens the signal-to-noise ratio due to strong scattering outside of the measuring volume, or when special properties of the optical amplifier in pulse mode allow for the anticipation of a significant advantage. The advantages of a measuring system designed according to the invention with a pulsed laser exist in that longer distances can be achieved as compared to an un-pulsed operation, without limiting normal pulsed systems with respect to spatial resolution and speed resolution.

A special further embodiment of the invention is characterized in that the light emitted by the laser light source is routed to an optical amplifier, particularly an erbium-doped fiber amplifier (EDFA), before the branching of the measuring and reference branch. Furthermore, polarization-maintaining fibers are preferably used for the measuring device designed according to the invention. If such fibers are not used, it is generally conceivable to provide at least one light-polarizing element, preferably a polarization regulator, particularly in the reference branch.

A LIDAR measuring device designed according to the invention, as has previously been described, is especially suitable for recording wind speed and/or a wind direction prevailing on the windward side of a wind turbine. In this context, it is further conceivable that a corresponding LIDAR measuring device is mounted on the spinner of a wind turbine and thus the speed and wind direction of the wind flowing to the wind turbine can be detected at a sufficient distance to enable, on one hand, an effective operation of the wind turbine and, on the other hand, to prevent damage to the wind turbine, for example due to sudden wind gusts, primarily by adjusting the pitch of the rotor blades in order to reduce the load or by initiating an emergency switch-off.

Furthermore, the invention also relates to a method for determining the speed of particles in a measuring volume, with which light is transmitted with a narrowband continuous wave laser light source and coupled into a measuring branch and a reference branch. The light coupled into the measuring branch is at least partially emitted by a transmitting device in the direction of the measuring volume in such a way that the emitted light is at least partially scattered and/or reflected by the particles in the measuring volume. At least a part of the scattered and/or reflected light is then received by a receiver device of the LIDAR measuring device and is coherently superimposed with the light leaving the reference branch, and the resulting light beam is directed onto a detector to generate a detector signal characteristic for the resulting light beam. The speed of the particles in the measuring volume is finally determined in an evaluation unit by taking into account the detector signal. The method according to the invention is characterized in that a frequency of the light emitted by the laser light source is varied, in a predefined manner, with a control device, and a spectral analysis of the detector signal is carried out in the evaluation unit in order to calculate the speed of the particles in the individual measuring regions of the measuring volume, while taking into account the predefined frequency modulation. In an advantageous manner, a laser diode, the injection current of which is varied based on a suitable control signal, is used as the laser light source.

Based on a corresponding variation of the frequency of the light emitted by the laser diode, it is possible to change the spatial resolution of the LIDAR measuring device without having to use a different laser light source or performing a mechanical adjustment.

In a special embodiment of the method according to the invention, it is further provided that the variation of the frequency of the light emitted by the laser light source takes place based on a control signal generated by the control device, said control signal corresponding to a noise signal precisely caused by a predefined frequency function.

In the following, the invention is explained in greater detail by means of exemplary embodiments with reference to the figures, without limiting the general concept of the invention. The following is shown:

DETAILED DESCRIPTION OF THE EMBODIMENTS

Figure 1:
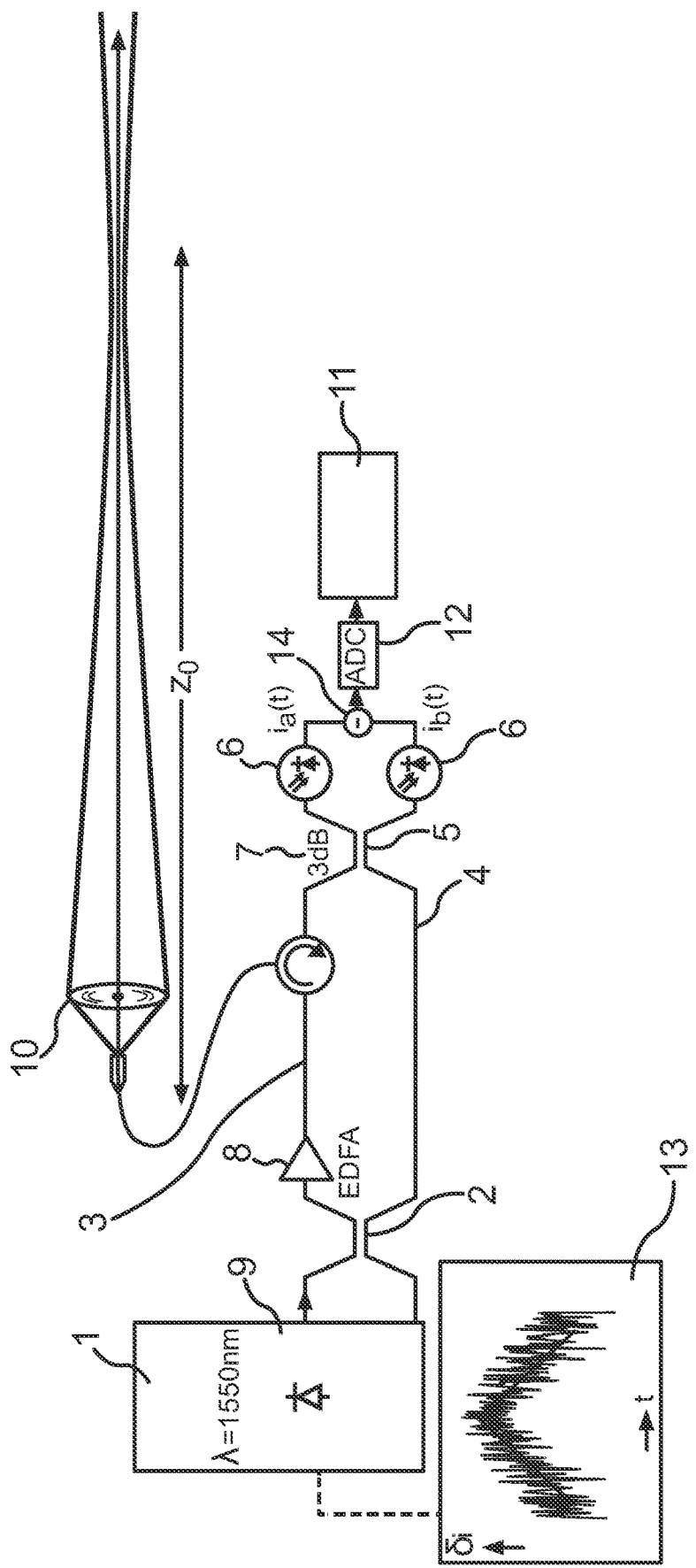
FIG. 1: principle structure of a LIDAR measuring device designed according to the invention.

FIG. 1 schematically shows a LIDAR measuring device designed according to the invention. The LIDAR measuring device has a continuous wave laser light source 1 with an output power of 10 mW, which emits light with a wavelength of 1550 nm. The light emitted by the laser light source 1 is coupled, on one hand, into an at least partially fiber-optically defined measuring branch 3 and, on the other hand, into a completely fiber-optically defined reference branch 4 with the help of a fiber-optic coupler, which takes on the function of a beam splitter 2.

The optic fibers used are preferably single mode fibers with low damping and a field radius of advantageous 5 μm. Polarization-maintaining fibers, so-called PM fibers, are preferably used.

A further fiber-optic coupler 5 is arranged at the end of the measuring branch 3 and the reference branch 4 for combining the light from the measuring branch 3 and from the reference branch 4. The light leaving the reference branch 4 is coherently superimposed with the received light and the resulting light beam is routed to the detector 6. According to this exemplary embodiment, the detector has two separate photodetectors, which are preferably designed as InGaAs detectors. Characteristic signals are generated for the detected beam with the help of the detector 6, wherein the two signals are subtracted from one another in a subtraction element 14 in order to eliminate faults. The difference signal is then supplied to an evaluation unit 11, in which the different signal is evaluated to detect the presence and/or movement of particles, by means of an analog-digital converter 12.

If no PM fibers are being used, an adjustable, fiber-optic polarization regulator and a diverting path, for example in the form of a wound section of the fiber, are provided in the reference branch 4.

The measuring branch has an erbium-doped fiber amplifier with a preferred output power of 1 W and an optic circulator 7, arranged sequentially, as the amplifier 8.

From the circulator 7, the light coupled into the measuring branch 3 is routed to a transmitting and receiving lens 10, with a focal length of 250 mm for example, and from there focused in the direction of the measuring volume to be measured and/or the respective measuring region.

The beam scattered and/or reflected in particles in the measuring volume then reaches, at least to a certain extent, the transmitting and receiving lens 10 of the LIDAR measuring device. In the exemplary embodiment shown here, the transmitting and receiver device are combined in the transmitting and receiving lens 10. The scattered and/or reflected light hereby received is subsequently coupled into the remaining fiber-bonded section of the measuring branch 3 via the circulator 7.

The continuous wave laser light source 1 has a laser diode 9 and is coupled to a control device 13, which varies the injection current of the laser diode 9 in a suitable manner such that the frequency of the light emitted from the laser diode is also changed. A frequency function is stored in the control device 13 as a function of the desired spatial resolution such that the light emitted by the laser light source 1 is changed, particularly broadened and deformed, as compared to the light typically emitted by the laser diode 9 by means of the modulation as a function of the frequency function in the optical power spectral density. With the help of the control device 13, the frequency of the emitted light is thus changed based on a suitable frequency function defining a pseudo-noise signal. Due to the consideration of various time-shifting values during the evaluation by the evaluation unit, the detection of particles and the movement thereof can be carried out separately in a spatially resolved manner, in purely mathematical terms, for various measuring regions remote from the lens 10 at different distances, without changing the described setup.

Essential for the invention is that the frequency of the light emitted by a laser light source 1 is precisely varied such that no phase modulator is required for the laser light source and furthermore no acoustico-optical modulator (AOM) is required, in contrast to the technical solutions known from the prior art.

In order to achieve a suitable frequency modulation such that the phase modulator used according to the prior art can be dispensed with and a modulation of the frequency of the emitted light is still achieved, which achieves the same effect as with the phase modulation $\Theta(t)$ used with known measuring systems, the current frequency of the laser diode according to $$f_{mom}(t) = \frac{1}{2\pi} \cdot \frac{d\Theta(t)}{dt}$$

must be changed, wherein $\Theta(t)$ corresponds to the respective phase. To do this, a modulation of the injection current of $$\delta i_{mod}(t) = \frac{1}{\gamma_{tun}} f_{mom}(t) = \frac{1}{2\pi\gamma_{tun}} \cdot \frac{d\Theta(t)}{dt}$$

is necessary.

However, this leads to an undesired modulation of the laser output power $$\delta P_{0,mod}(t) = \beta \cdot \delta i_{mod}(t) = \frac{\beta}{2\pi\gamma_{tun}} \cdot \frac{d\Theta(t)}{dt}$$

wherein $\beta = dP_0/di$ characterizes the slope efficiency, for which 0.2 mW/mA can be assumed as a reference value.

From the laser output power $P_0 + \delta P_{0,mod}$, a part $\rho$ is coupled into the LO branch, wherein the modulation-based variation of the transmitting power is insignificant:

$$P_{LO} + \delta P_{LO}(t) =$$
$$\rho(P_0 + \delta P_{0,mod}(t)) = \rho P_0 + \rho \beta \cdot \delta i_{mod}(t) = \rho P_0 + \frac{\rho \cdot \beta}{2\pi\gamma_{tun}} \cdot \frac{d\Theta(t)}{dt}$$

With an ideal, balanced reception, the variation of the LO power is not noticeable. With a real, balanced reception, an AC signal of $$\delta i_{Det} = \varepsilon \cdot \mathcal{R} \cdot \delta P_{LO}(t) = \frac{\varepsilon \cdot \mathcal{R} \cdot P_{LO} \cdot \beta}{2\pi\gamma_{tun} \cdot P_0} \cdot \frac{d\Theta(t)}{dt}$$

with the photodiode response sensitivity R=1 A/W is received. As a comparison, a detector current results for a (corrected) useful signal of power $P_{signal}$ with the root mean square $$i_{signal,eff} = \mathcal{R} \cdot \frac{1}{\sqrt{2}} \sqrt{P_{signal} \cdot P_{LO}}$$

For a rough comparison, the root mean square of $f_{mom}(t)$, where $$\overline{f_{mom}^2(t)} = \frac{1}{2} f_{max}^2$$

is estimated. This results in $$\frac{\overline{(\delta i_{Det})^2}}{(i_{signal,eff})^2} \cong \left(\frac{\varepsilon \mathcal{R} P_{LO} \beta \cdot f_{max}}{\gamma_{tun} \cdot P_0}\right)^2 \cdot \frac{1}{\mathcal{R}^2 \cdot P_{signal} \cdot P_{LO}} = \left(\frac{\varepsilon \beta \cdot f_{max}}{\gamma_{tun} \cdot P_0}\right)^2 \cdot \frac{P_{LO}}{P_{signal}}$$

Where
$\varepsilon = 0.01$; $\beta = 0.2$ mW/mA; $\gamma_{tun} = 100$ MHz/mA; $P_0 = 20$ mW; $f_{max} = 10$ MHz; $P_{LO} = 100$ μW, this results in $$\frac{\overline{(\delta i_{Det})^2}}{(i_{signal,eff})^2} \cong \frac{10^{-14} W}{P_{signal}}$$

Figure 2:
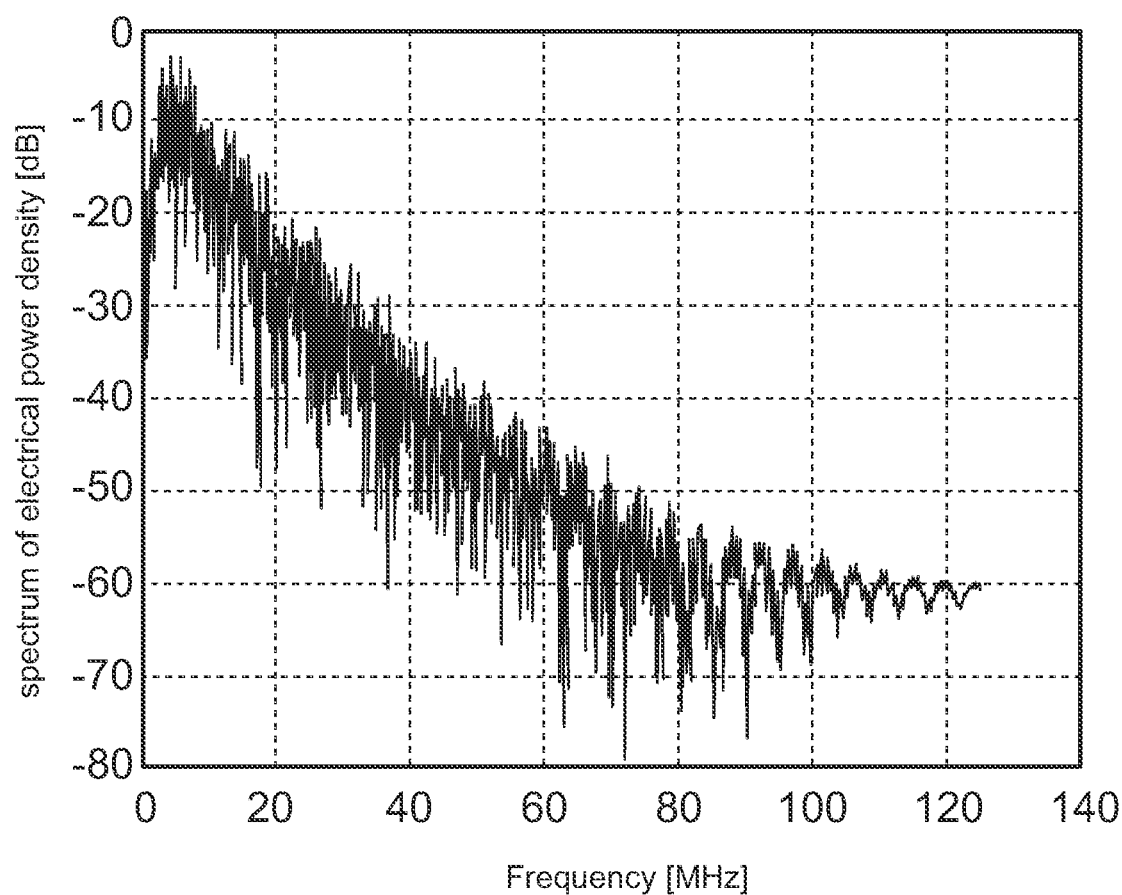
FIG. 2: curve of the electrical power spectral density as a function of the frequency.

This comparison makes it clear that the modulation-based noise background does not need to be considered with such a root mean square. In addition, it should be considered that the signal is narrowband, for example 100 kHz, while the modulation-based noise is broadband and is concentrated on the low-frequency frequency domain, as is shown in FIG. 2.

With the phase modulation known in the prior art with the electro-optical phase modulator, the predefined phase $\Theta(t)$ is used for correction. The phase modulator is actuated with a signal proportional to the phase. This can result in a scaling error such that the phase impressed on the optical signal is $\tilde{\Theta}(t) = \eta_{scale} \cdot \Theta(t)$. In this context, it is known that values of $\eta_{scale} = 0.9$ to 1.1 are non-critical.

With the direct modulation, provided according to the invention, of the laser light source with the help of a suitable frequency function, a modulation signal according to $$\delta i_{mod}(t) = \frac{1}{\gamma_{tun}} f_{mom}(t) = \frac{1}{2\pi \gamma_{tun}} \cdot \frac{d\Theta(t)}{dt}$$

is impressed on the injection current. If a scaling error occurs in this case as well, to which the following applies $$\delta \tilde{i}_{mod}(t) = \eta_{scale} \cdot \frac{1}{2\pi \gamma_{tun}} \frac{d\Theta(t)}{dt} = \frac{1}{2\pi \gamma_{tun}} \cdot \frac{d(\eta_{scale}\Theta(t))}{dt}$$

the effects are thus the same. This directly means that the LIDAR measuring device according to the invention, with which a frequency modulation is carried out directly on the laser light source, is implementable such that the previously used phase modulator can be omitted.

As shown already with the previous statements, it is known from the prior art to subject the optical wave emitted by a laser light source to a predefined phase modulation $\Theta(t)$ with the help of a phase modulator and to shift the optical frequency in an interferometer arm by $f_{AOM}$ by means of an acoustico-optical modulator (AOM). A fixed target at a distance z then provides a detector signal $$u(t) \propto \exp\left\{j\left[2\pi f_{AOM} t + \Theta\left(t - \frac{2z}{c}\right) - \Theta(t)\right]\right\} \quad (1)$$

If the target moves at speed v in the +z direction, a Doppler shift $$f_{Doppler} = -\frac{2}{\lambda} v$$

also occurs:

$$u(t) \propto \exp\left\{j\left[2\pi f_{AOM} t + 2\pi f_{Doppler} t + \Theta\left(t - \frac{2z}{c}\right) - \Theta(t)\right]\right\} \quad (2)$$

For correction, this signal can be multiplied by the known function $$h(t;z) \propto \exp\left\{-j\left[\Theta\left(t - \frac{2z}{c}\right) - \Theta(t)\right]\right\} \quad (3)$$

The corrected signal for position z is then purely sinusoidal:

$$u_{cnt}(t) = u(t) \cdot h(t;z) \propto \exp\{j[2\pi f_{AOM} t + 2\pi f_{Doppler} t]\} \quad (4)$$

In the spectrum, it provides a narrow line for $f_{AOM} + f_{Doppler}$.

If this correction function $h(t;z)$ is used, the target is at locations $$z_1 < z - \frac{\Delta z_{LC}}{2} \text{ or } z_2 > z + \frac{\Delta z_{LC}}{2},$$

thus the electrical power spectral density is broad. The width depends on $\Theta(t)$. Likewise, the variable $\Delta z_{LC}$ depends on the phase pattern $\Theta(t)$ and is characterized as the spatial resolution, constrained by the modulation-based low coherence. Corresponding phase patterns, e.g. for $\Delta z_{LC} = 5$ m, 10 m, 15 m, can be found numerically by means of a special iteration process. Targets within range $$\left[z - \frac{\Delta z_{LC}}{2}, z + \frac{\Delta z_{LC}}{2}\right] \quad (5)$$

thus provide approximately a narrow spectrum for the frequency $f_{AOM} + f_{Doppler}$ having a width $$\delta f = \frac{q}{T},$$

which is essentially provided by the measuring time T. Outside of this range, a broad spectrum is obtained.

According to a further embodiment of the invention, the frequency of the light emitted by the laser light source, particularly a laser diode, is changed into two types. In this context, there is a stochastic modulation of the frequency and, in addition, the frequency of the light emitted by the laser light source is changed in a time-linear manner. The following applies:

$$f_{laser} = f_{laser,0} + \Gamma \cdot t \quad (6)$$

Thus a detector signal is obtained according to $$u(t) \propto \exp\left\{j\left[2\pi \Gamma \cdot \frac{2z}{c} \cdot t + 2\pi f_{Doppler} t + \Theta\left(t - \frac{2z}{c}\right) - \alpha(t)\right]\right\} \quad (7)$$

In contrast to equation (2), the location-dependent, chirp-based frequency $$f_{chirp}(z) = \Gamma \cdot \frac{2z}{c}$$

then occurs here in place of the constant frequency $f_{AOM}$.

If there is a correction where h(t;z) according to eq. (3), a result according to eq. (4) is obtained:

$$u_{ent}(t) = u(t) \cdot h(t;z) \propto \exp\left\{j\left[2\pi \, \Gamma \cdot \frac{2z}{c} \cdot t + 2\pi f_{Doppler} t\right]\right\} \quad (8)$$

Because the chirp rate $\Gamma$ and the location z are defined and thus are known, the Doppler frequency $f_{Doppler}$ can be determined therefrom.

If the location of the target is then changed, but the correction function h(t;z) is retained, modified chirp-based frequencies as follows are thus obtained at the edges $$z \pm \frac{\Delta z_{LC}}{2}$$

of the spatial resolution $$f_{chirp}\left(z \pm \frac{\Delta z_{LC}}{2}\right) = \Gamma \cdot \frac{2z}{c} \pm \Gamma \cdot \frac{\Delta z_{LC}}{c} = f_{chirp}(z) \pm \frac{\delta f_{chirp}}{2} \quad (9)$$

Within the interval $$\left[z - \frac{\Delta z_{LC}}{2}, z + \frac{\Delta z_{LC}}{2}\right],$$

the frequency in the spectrum is thus smeared by $\delta f_{chirp}$. To ensure that the Doppler resolution is not substantially worsened as compared to the solution known from the prior art which uses an acoustico-optical modulator (AOM), the following must apply $$\delta f_{chirp} \leq \delta f \quad (10)$$

This results in $$\Gamma \cdot \frac{2\Delta z_{LC}}{c} \leq \delta f \Rightarrow \Gamma \leq \frac{c}{2\Delta z_{LC}} \cdot \delta f \quad (11)$$

If the largest-possible $$\Gamma = \frac{c}{2\Delta z_{LC}} \cdot \delta f$$

$\Gamma$ is selected and measurements where $\Gamma = |\Gamma|$ and $\Gamma = -|\Gamma| \oplus$ are carried out, which correspond to a triangular frequency modulation, spectral lines after correction are obtained with the frequencies $$f_+ = \left||\Gamma| \cdot \frac{2z}{c} - f_{Doppler}\right| = \left|\frac{z}{\Delta z_{LC}} \cdot \delta f - f_{Doppl}\right| \text{ and} \quad (12)$$

$$f_- = \left|-|\Gamma| \cdot \frac{2z}{c} - f_{Doppler}\right| = \left|\frac{z}{\Delta z_{LC}} \cdot \delta f - f_L\right|$$

For the Doppler frequency, the following thus applies:

$$f_{Doppler} = -\frac{f_+^2 - f_-^2}{4 \cdot \frac{z}{\Delta z_{LC}} \cdot \delta f} \quad (13)$$

If one of the frequencies is $f_\pm < \delta f$ and thus not determinable, it again applies that $f_{Doppler}$ can also be determined from the other one:

If $f_- > f_+$, then $f_{Doppler} > 0 \rightarrow$ (14a)

$$f_{Doppler} = f_- - \frac{z}{\Delta z_{LC}} \cdot \delta f$$

If $f_- < f_+$, then $f_{Doppler} < 0 \rightarrow$ (14b)

$$f_{Doppler} = \frac{z}{\Delta z_{LC}} \cdot \delta f - f_+$$

A few specific calculation examples are shown in the following:

$\Delta z_{LC} = 10$ m, $\delta f = 0.5$ MHz, $q = 2$ (15)

$\Rightarrow T = 4$ μs, $\Gamma = 7.5 \cdot 10^{12}$ Hz/s = 7.5 MHz/μs, $\Gamma \cdot T = 30$ MHz, $\Delta i_{tot} = \Gamma \cdot T / \gamma_{tun} = 37.5$ μA (i) $z = 10$ m, $f_{Doppler} = 10$ MHz $\Rightarrow f_1 = 9.5$ MHz, $f = 10.5$ MHz (ii) $z = 50$ m, $f_{Doppler} = 10$ MHz $\Rightarrow f_- = 7.5$ MHz, $f_- = 12.5$ MHz (iii) $z = 100$ m, $f_{Doppler} = 10$ MHz $\Rightarrow f_- = 5$ MHz, $f_- = 15$ MHz (iv) $z = 20$ m, $f_{Doppler} = 1$ MHz $\Rightarrow f_1 = 0$ MHz, $f = 2$ MHz For the frequency modulation of the current supply of the laser light source, particularly of the injection current of a laser diode, the following considerations are significant. In this manner, a suitable frequency modulation and the linear frequency chirp can be implemented.

With a predefined phase pattern $\Theta(t)$ in order to implement a spatial resolution $\Delta z_{LC}$ and a desired linear frequency chirp (chirp rate $\Gamma$), the total phase modulation of the optical wave must be $$\Theta_{tot}(t) = \Theta(t) + \frac{1}{2} 2\pi \Gamma \cdot t^2$$

and the corresponding frequency modulation and current modulation $$f_{tot}(t) = \frac{1}{2\pi} \cdot \frac{d\Theta_{tot}(t)}{dt} = \frac{1}{2\pi} \cdot \frac{d\Theta(t)}{dt} + \Gamma \cdot t$$

$$\delta i_{mod}(t) = \frac{1}{\gamma_{tun}} f_{tot}(t) = \frac{1}{2\pi \gamma_{tun}} \frac{d\Theta(t)}{dt} + \frac{\Gamma}{\gamma_{tun}} \cdot t$$

Figure 3:
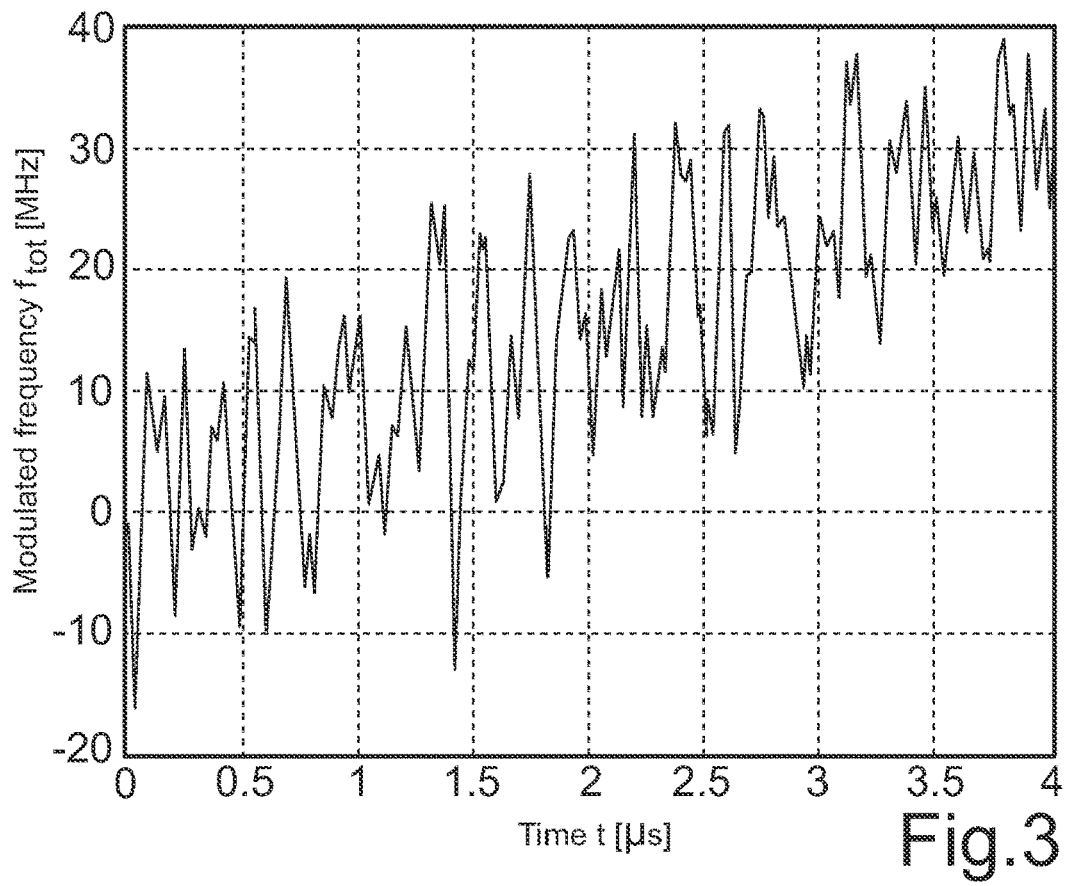
FIG. 3: curve of a modulated frequency over a section of time.
Figure 4:
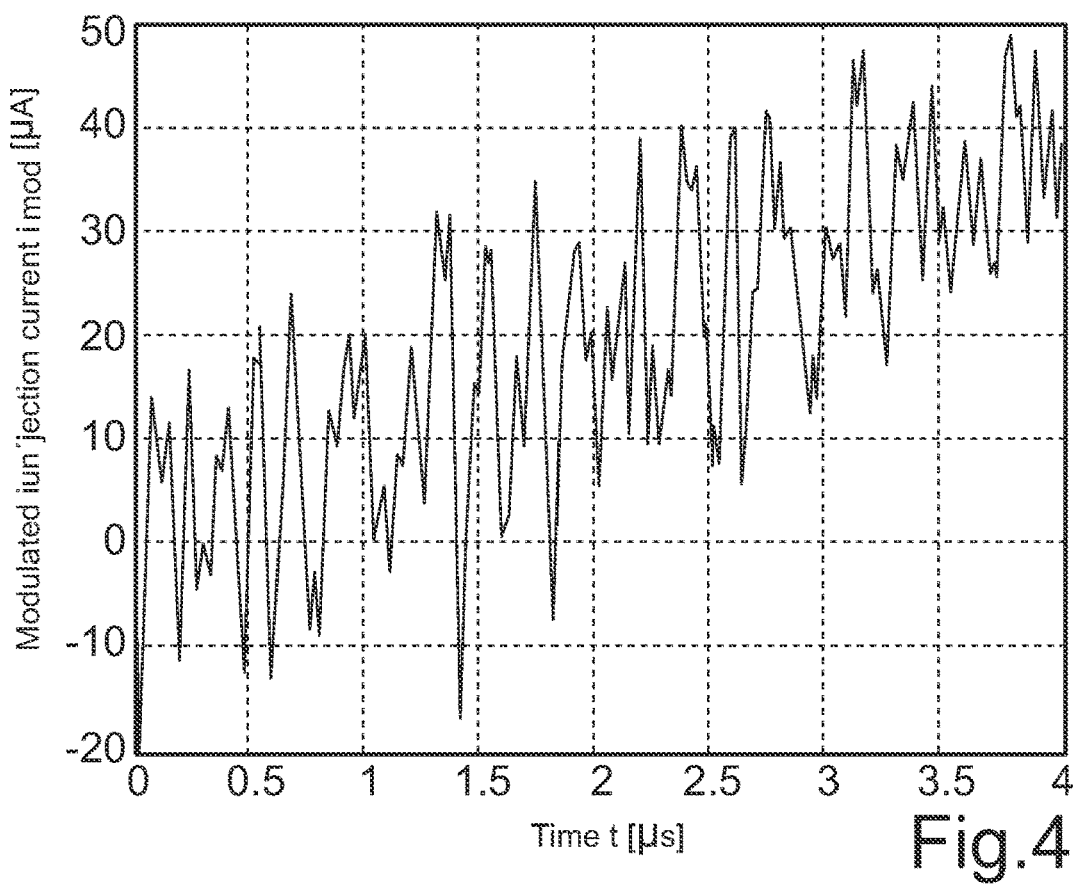
FIG. 4: curve of the modulated injection current over a section of time.

FIGS. 3 and 4 each show exemplary measurements, which prove the previous calculations. FIG. 3 in this case shows the curve of the frequency $f_{tot}$ in MHz and FIG. 4 shows the modulated injection current $\delta i_{mo}d$ in μA, each over a timeframe of 4 μs ($\Gamma$=7.5 MHz/μs, $\gamma_{tun}$=800 MHz/mA)

The specification incorporates by reference the disclosure PCT/EP2018/057050, filed Mar. 20, 2018 and DE 10 2017 106 226.2, filed Mar. 22, 2017.

The present invention is, of course, in no way restricted to the specific disclosure of the specification and drawings, but also encompasses any modifications within the scope of the appended claims.

LIST OF REFERENCE NUMERALS

1 Laser light source
2 Beam splitter
3 Measuring branch
4 Reference branch
5 Fiber-optic coupler
6 Detector
7 Circulator
8 Amplifier
9 Laser diode
10 Lens
11 Evaluation unit
12 Analog-digital converter
13 Control device
14 Subtraction element

The invention claimed is:

1. A LIDAR measuring device for determining the speed of particles in a measuring volume, comprising:
    a narrowband continuous wave laser light source (1) that emits light that is coupled into a measuring branch (3) and a reference branch (4);
    a transmitting device, wherein the light coupled into the measuring branch (3) is at least partially emitted by the transmitting device in a direction of the measuring volume in such a way that the emitted light is at least partially scattered and/or reflected by the particles in the measuring volume;
    a receiver device, wherein at least a part of the scattered and/or reflected light is received by the receiver device and is coherently superimposed with the light leaving the reference branch (4) to form a resulting light beam;
    a detector (6) to receive the resulting light beam and to generate a detector signal characteristic for the resulting light beam;
    an evaluation unit (11) to determine a speed of the particles in the measuring volume by taking into account the detector signal;
    a control device (13) to vary the frequency of the light emitted by the laser light source (1), wherein the evaluation unit (11) is configured to determine the speed of the particles in at least one measuring region of the measuring volume on the basis of a spectral analysis of the detector signal by taking into account a predefined frequency modulation, wherein the variation of the frequency of the light emitted by the laser light source (1) takes place based on a control signal generated by the control device (13), said control signal corresponding to a pseudo-noise signal caused by a predefined frequency function.

2. The LIDAR measuring device according to claim 1, wherein the control device (13) changes a current strength of the supply current for the laser light source (1) in order to vary the frequency of the emitted light.

3. The LIDAR measuring device according to claim 1, wherein the laser light source (1) has a laser diode (9), wherein an injection current of the laser diode (9) is modified in order to vary the frequency of the emitted light.

4. The LIDAR measuring device according to claim 1, wherein the frequency modulation is selected in such a way that the laser light source (1) emits light with a coherence length of from 0.1 to 100 m.

5. The LIDAR measuring device according to claim 1, wherein the laser light source (1) emits light with a coherence length of from 1 to 50 m.

6. The LIDAR measuring device according to claim 1, the control device (13) of the laser light source impresses an additional signal in such a way that an additional time-linear portion is added to the frequency of the emitted light.

7. The LIDAR measuring device according to claim 6, wherein the time-linear change in the frequency of the emitted light is selected to be large enough that the sign of the difference does not change despite a Doppler shift of the frequency of the received light as compared to the transmitting frequency, said shift being caused by movement of the particles.

8. The LIDAR measuring device according to claim 1, wherein the control device (13) changes the current strength such that the frequency of the light emitted by the laser light source (1) is varied linearly upward and downward.

9. The LIDAR measuring device according to claim 1, wherein the control device (13) is configured such that the emitted light is pulsed, wherein pulse lengths are selected such that they are longer than what corresponds to the desired spatial resolution, such that the spatial resolution continues to be determined by the frequency modulation of the laser light source.

10. The LIDAR measuring device according to claim 1, wherein an optical switch is arranged in the measuring branch (3).

11. The LIDAR measuring device according to claim 10, wherein the optical switch is an acoustico-optical modulator.

12. The LIDAR measuring device according to claim 1, wherein at least one element polarizing the light is arranged in the reference branch (4).

13. A use of a LIDAR measuring device according to claim 1 to record a wind speed and/or a wind direction on the windward side of a wind turbine.

14. A use of a LIDAR measuring device according to claim 1 to record a wind speed and/or a wind direction on the windward side of a wind turbine, wherein the measuring device is attached to a spinner of the wind turbine.

15. A method for determining the speed of particles in a measuring volume, comprising:
    transmitting light with a narrowband continuous wave laser light source (1) and coupling the transmitted light into a measuring branch (3) and a reference branch (4);
    at least partially emitting the light coupled into the measuring branch (3) by a transmitting device in the direction of the measuring volume in such a way that the emitted light is at least partially scattered and/or reflected by the particles in the measuring volume;
    receiving by a receiver device at least a part of the scattered and/or reflected light and coherently superimposing the at least a part of the scattered and/or reflected light with the light leaving the reference branch (4) to form a resulting light beam;
    directing the resulting light beam onto a detector (6) to generate a detector signal characteristic for the resulting light beam;
    determining a speed of the particles in the measuring volume in an evaluation unit (11) by taking into account the detector signal, wherein the frequency of the light emitted by the laser light source (1) is varied with a control device (13) and a spectral analysis of the detector signal is carried out in the evaluation unit (11) in order to calculate the speed of the particles in at least one measuring region of the measuring volume, by taking into account a predefined frequency modulation, wherein the variation of the frequency of the light emitted by the laser light source (1) takes place based on a control signal generated by the control device (13), said control signal corresponding to a pseudo-noise signal caused by a predefined frequency function.

16. The method according to claim 15, wherein the variation of the frequency of the light emitted by the laser light source (1) takes place based on a control signal generated by the control device (13), said control signal containing a time-linear portion.

\* \* \* \* \*